United States Patent [19]
Mead et al.

[11] Patent Number: 4,786,818
[45] Date of Patent: Nov. 22, 1988

[54] INTEGRATED SENSOR AND PROCESSOR FOR VISUAL IMAGES

[75] Inventors: Carver A. Mead; Michelle A. Mahowald; Massimo A. Sivilotti, all of Pasadena, Calif.

[73] Assignee: California Institute of Technology, Pasadena, Calif.

[21] Appl. No.: 118,264

[22] Filed: Nov. 9, 1987

[51] Int. Cl.$^4$ .................... H01J 40/14; H02H 00/00
[52] U.S. Cl. .................... 250/578; 307/328
[58] Field of Search .................... 250/578, 208, 209; 358/213; 357/30 H, 24 LR; 307/328, 492

[56] References Cited

U.S. PATENT DOCUMENTS

| | | | |
|---|---|---|---|
| 4,602,289 | 7/1986 | Sekine | 357/24 |
| 4,644,178 | 2/1987 | Michalik | 250/578 |
| 4,680,476 | 7/1987 | Berger et al. | 250/578 |
| 4,733,097 | 3/1988 | Iwabuchi et al. | 358/213.15 |

Primary Examiner—David C. Nelms
Assistant Examiner—William L. Oen
Attorney, Agent, or Firm—Freilich, Hornbaker, Rosen & Fernandez

[57] ABSTRACT

An integrated sensor and analog processor for visual images is produced from an array of photoreceptor signals that are the space-time derivative of the photoreceptor outputs. Each photoreceptor output $V_R$ is first processed by an integrator having a predetermined time constant using a differential transconductance amplifier driving an integrating capacitor, and feeding the output signals $V_H$ back to the negative input, thereby generating a time integrated signal for each pixel of the array. The output terminal of the integrating amplifier is connected to a node that is coupled to the outputs of similar integrators of neighboring pixels by resistive connections thereby forming a spatially smoothed version of the image. At each node a differential amplifier takes the difference between the node potential and local receptor potential, whereby an output representing a first temporal derivative and second spatial derivative is computed.

13 Claims, 11 Drawing Sheets

FIG. 5a $V_T$ = THRESHOLD VOLTAGE

INTEGRATED SENSOR AND PROCESSOR FOR VISUAL IMAGES

BACKGROUND OF THE INVENTION

This invention relates to an integrated sensor and analog signal processor for visual images, and in particular to an integrated sensor and processor which emulates the vertebrate retina in producing space-time derivative signals in response to image pixels.

While models have been proposed for the visual system, it is not possible to simulate enough cases to gain real confidence in the model, even on the most powerful computers. For this reason, one can not really understand visual processing, especially with respect to motion, until one succeeds in building a system that does visual processing in real time. Until recently there has not been a technology in which such fundamental synthetic investigations could be carried out. With the evolution of high-density VLSI technology, a way has been discovered for these extremely important investigations to be done.

By far the most massive application of large-scale integrated circuits has been in digital systems. While analog integrated circuit techniques have developed along with digital techniques, no methods comparable to digital techniques exist for managing the complexity of extremely large analog systems. This invention presents not only a prototype vision system, but illustrates an approach to problems of this class.

A large fraction of the processing done in early vision systems of animals is connected with extracting motion events. The value of such processing is evident. Information is sent from the retina up the optic nerve to the brain by neural action potentials. Each nerve impulse corresponds to some significant event in the incoming image. If simple intensity encoding were used, pixels in the image would be sampled at some rate determined by the local intensity. Any change in intensity would be reflected as a change in pulse rate. The time such a change had occurred could only be determined to the time between pulses. In signal processing terms, the derivative information would have been "aliased away" by temporarily sampling the image. For this reason, optic nerve pulses sent from all but the most central part of the retina encode changes in intensity rather than the intensity itself. In this way, an individual nerve pulse corresponds to an important feature in the image moving over the particular place on the retina. Higher level correlation between events can then be reconstructed without loss of information due to temporal aliasing.

In artificial vision systems, a similar problem is encountered. A standard television camera samples any point in the image once every 1/30 second. An object can easily move many pixels between sample times. Information is in this way irreversibly aliased away. The present invention, like the human retina, uses an easy computation (taking a time derivative) to simplify solving the much harder correspondence problem (finding the point in a second image that corresponds to a given point in the first image).

The problem of machine vision can be enormously eased by extracting time-space derivative information before it is aliased away. In the present invention, an electronic replica of the vertebrate retina computes time-space derivative information in analog fashion. The overall structure of the retina is described, together with a set of detailed circuits (implemented in standard CMOS technology) that form a reasonably faithful model of certain processing that occurs in a mammalian retina.

SUMMARY OF THE INVENTION

An integrated sensor and analog processor for visual images is provided to produce from an array of photoreceptors signals that are the space-time derivative of the photoreceptor outputs. Each photoreceptor output $V_R$ is first processed by an integrator having a predetermined time constant $\tau$ using a differential transconductance amplifier driving an integrating capacitor, and feeding the output signals $V_H$ back to the negative input, thereby generating a time averaged signal for each pixel of the array. The output terminal of the integrating amplifier is coupled to similar outputs of the integrators of neighboring pixels by resistive connections. These connections sum the signals connected to the integrator output node by the resistive means to provide a local potential $V_H$ which is a spacial average of the receptor outputs. A circuit which emulates a bipolar cell computes the difference $V_R-V_H$ for on-center pixels, and $V_H-V_R$ for off-center pixels. The on-center and off-center signals are complementary, and so may be generated either with two differential amplifiers, or preferably with one complementary output differential amplifier. For each resistive connection, there is one coupling transistor at each end controlled by a means for biasing the strength of the coupling.

BRIEF DESCRIPTION OF THE DRAWINGS

FIG. 6d is a current-voltage graph for the circuit of FIG. 6a.

DESCRIPTION OF PREFERRED EMBODIMENTS

Figure 1:
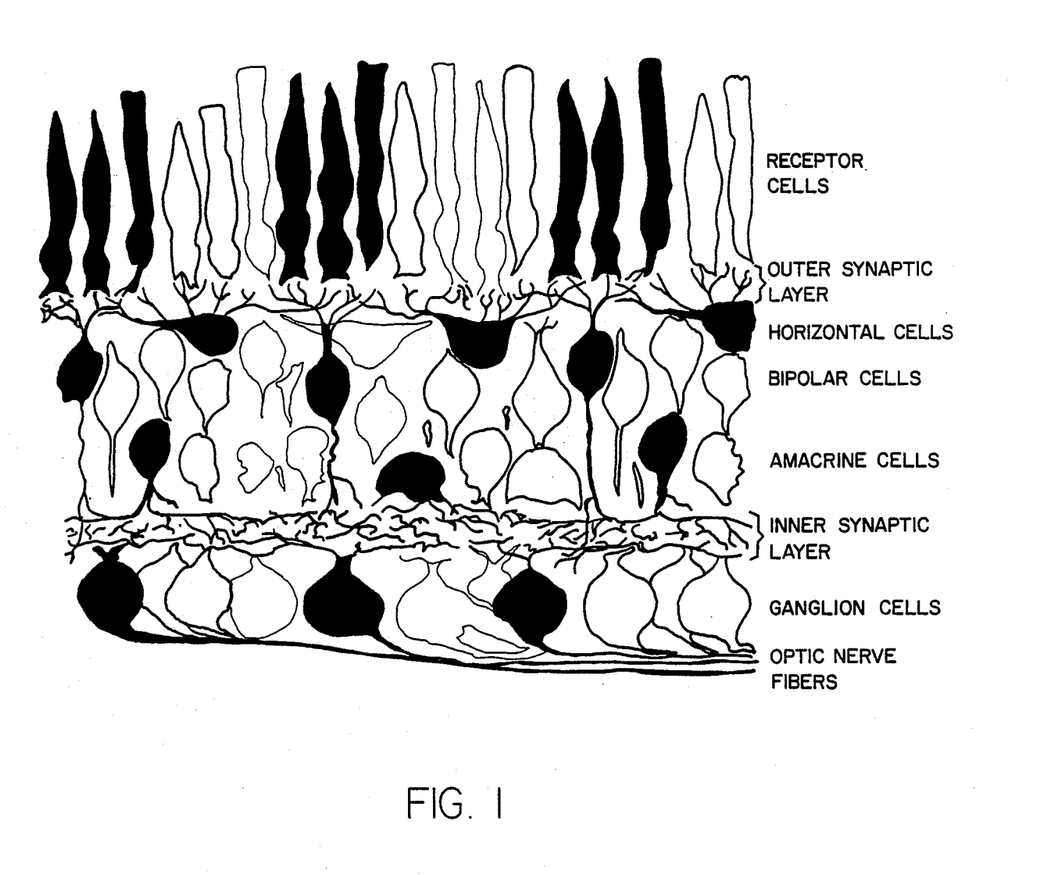
FIG. 1 illustrates an idealized neural apparatus of a mammalian retina based on a micrograph of a horizontal cross section tissue of the retina prepared by selective staining.

FIG. 1 illustrates an idealized neural apparatus of the mammalian retina in one horizontal plane based on a micrograph of a cross section of tissue selectively stained. Only the apparatus on the surface of the tissue which has been stained the darkest is shown solid in the drawing; others below the surface are shown in outline. The optical image passes through the neural sheet of the retina and enters receptor (light sensor) cells, each of which produces a signal proportional to the logarithm of the intensity of the corresponding pixel in an image. The signal from a receptor cell is compared with signals from those adjacent to it in an outer synaptic layer in order to determine whether it is significantly different.

The resulting spatial difference signals are coupled through bipolar cells to amacrine cells where time derivative signals are computed. The derivative signals, i.e., the local derivatives of the spatial difference signals, are compared in an inner synaptic layer with the derivative signals around it. It is believed that, in some animals, the amacrine cells sum bipolar cell output signals from an asymmetric inhibiting neighborhood, and integrate the sum with respect to time. Since they have limited memory of the past, they may be visualized as leaky integrators with a summing input stage so that their outputs will return to zero if no inputs are active. Their outputs are thus delayed from their inputs, and are constrained to lie between zero and some signal level determined by the saturation levels of the integrators. In general, there are two kinds of amacrine cells, those that aggregate on-center or off-center surrounds and those that aggregate both on-center and off-center surrounds of bipolar outputs.

The inner synaptic layer not only compares the derivative signals, but also provides a shunting inhibition in the dendritic tree of the ganglion. If no inhibition is present, the outputs of bipolar cells from the center of the receptive field is allowed to pass through to a ganglion cell. If an inhibiting amacrine output is present, less bipolar cell signal is allowed to pass, and if the inhibiting amacrine output exceeds a certain threshold level, no signal is allowed to pass. The dendritic network of the ganglion cells sums the output signals of a number of bipolar and amacrine cells, thus imaging the receptive field of the bipolar cells.

The ganglion cell integrates the state of activity (signals) over a number of bipolar receptive fields with respect to time, and if the aggregate exceeds a certain value, it issues a pulse and decreases the aggregate. As in the case of the amacrine cells, the integral is constrained to be between zero and some signal level. The output signals of the ganglion cells are then applied to optic-nerve fibers that are connected in the brain.

In summary, the idealized neural apparatus illustrated in FIG. 1 provides an array of receptor cells, bipolar cells and ganglion cells which provide signal paths from the receptor cells to the optic nerve fibers that connect to the brain where the signals are interpreted. The amacrine cells carry information across the retina at two different levels of activity, one level of comparing derivative signals and another of inhibition shunting in the dendritic network, i.e., the dendrites of the ganglion cells.

Figure 2:
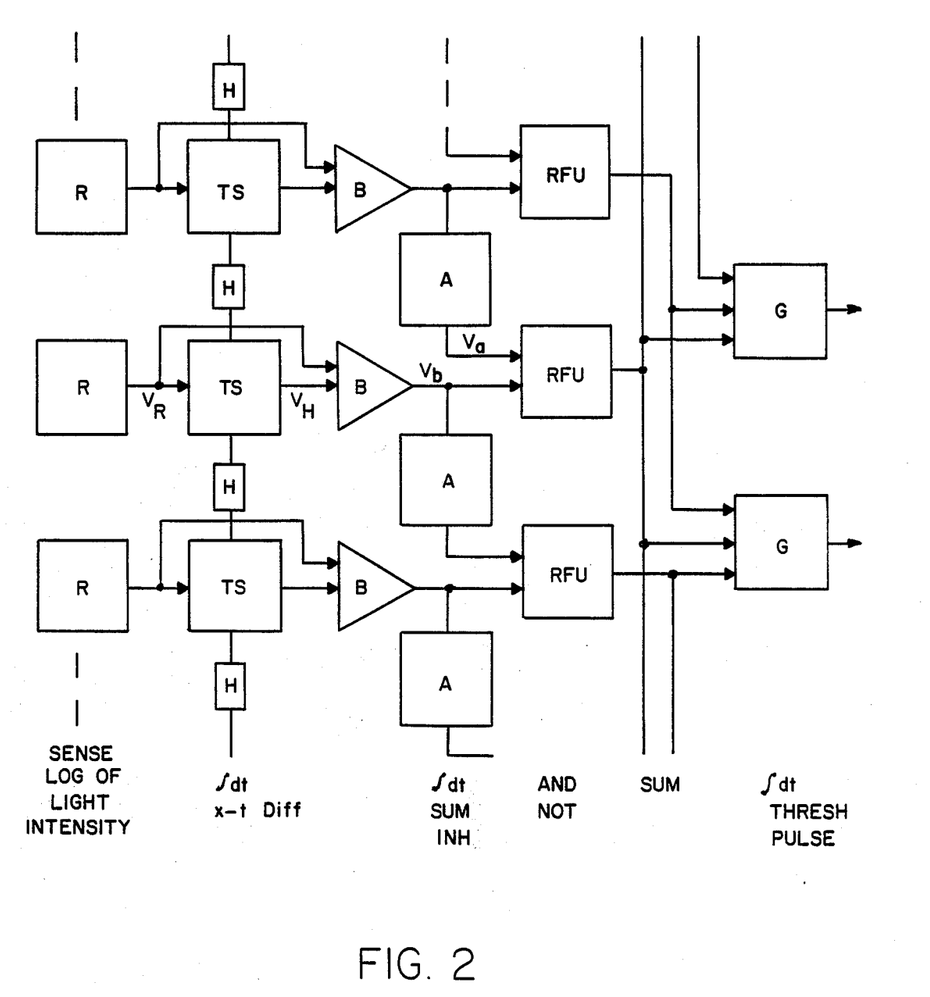
FIG. 2 illustrates a block diagram of an integrated electronic vision system for modeling the neural apparatus of FIG. 1.
Figure 3:
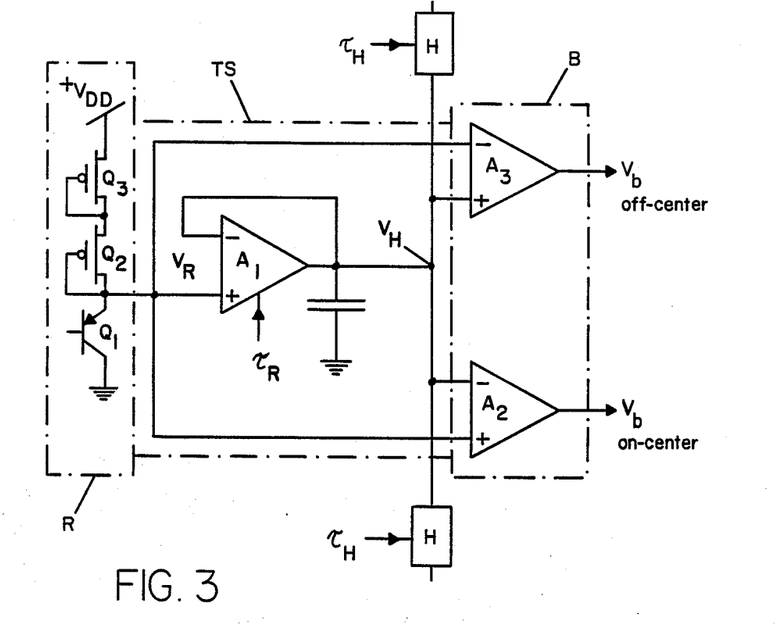
FIG. 3 illustrates an electronic embodiment of the triad synapse TS connected to a photoresistor R at its input, and a bipolar cell B connected at its output.

In accordance with this invention, the idealized neural apparatus is modeled as shown in FIG. 2 wherein an array of photoreceptors R are connected to an array of triad synapses TS which compute signals that are each the integrated difference between the potential $V_R$ of the receptor connected to it and the potential $V_H$ of a horizontal network of resistors H, as shown in FIG. 3.

A phototransistor (p-n-p junction transistor) $Q_1$ produced on the same substrate as a byproduct of the conventional CMOS process that implements the rest of the VLSI system is illustrated in FIG. 3. It differs from a conventional bipolar transistor by having a large base-collector junction as a light-collecting element. With the base unconnected (floating), the photogenerated carriers contribute a photocurrent in the emitter which lowers the base-emitter potential to produce a total increase in collector current. Therefore a decrease in emitter voltage $V_R$ from $+V_{DD}$ toward O volts is produced as a function of light intensity. Note that two p-channel CMOS transistors $Q_2$ and $Q_3$ are used as exponential load elements in the emitter-follower circuit of the transistor photoreceptor R, thereby producing an output voltage $V_R$ that is proportional to the logarithm of the light intensity.

The collector of the bipolar transistor is preferably formed by the substrate, and the substrate is connected to a first power supply terminal. The base of the bipolar transistor is formed by a well diffusion. The emitter is formed by a diffused area within the base well region of opposite type from the type of the well region. First and second diodeconnected MOS transistors $Q_2$ and $Q_3$, each having source, gate, and drain terminals, have their gate connected to their drain. The diode-connected transistors have source and drain diffusions of the type opposite to the type of the well, and are fabricated within a well region isolated from the well region forming the base of the bipolar transistor. The source electrode of the diode-connected transistor $Q_3$ is connected to a power supply terminal, $V_{DD}$ and to the well region containing the two diode-connected transistors. The drain of the diode-connected transistor $Q_2$ is connected to the gate of the diode-connected transistor $Q_2$ and to the emitter of the bipolar transistor. In that manner, a light image focused upon the surface of the integrated circuit produces signal inputs that are logarithmic in the intensity of the light image.

From the circuit diagram of a triad synapse shown in FIG. 3, it is seen that the output $V_R$ of a photoreceptor R is integrated with a time constant $\tau_R$ and combined with the local potential of horizontal network of resistors H to produce an output $V_H$. That output $V_H$ is substracted from the receptor output $V_R$ in the amplifier $A_1$. In that manner, the triad synapse takes the difference between the local potential $V_H$ of the horizontal network and the receptor output $V_R$, and drives the local potential $V_H$ of the horizontal network toward the receptor output $V_R$ in the process.

The receptor output $V_R$ and the local potential of the horizontal resistance network $V_H$ are connected to difference amplifiers $A_2$ and $A_3$, which correspond to a bipolar cell B in FIG. 2. Thus, the $V_b$ ON-CENTER signal is the amplified difference $V_R-V_H$ between the input signal $V_R$ and the local potential, where the response $V_H$ is delayed not only by the time constant $\tau_R$ of the integrator, but also the time constant $\tau_H$ of the horizontal resistors H. The $V_b$ OFF-CENTER signal is the amplified difference $V_H-V_R$. Thus, bipolar cells B compute complementary signals $V_b$ ON-CENTER and $V_b$ OFF-CENTER that are the respective amplified differences $V_R-V_H$ and $V_H-V_R$ between the receptor signals $V_R$ and the local potential $V_H$.

Each of the circuits described below is assumed to be implemented in n-well CMOS technology. The transistors with bubbles on their gates are in the well, those without bubbles are in the substrate. The only change needed for p-well technology is that of the power supply and signal polarities are negative instead of positive.

Figure 4A:
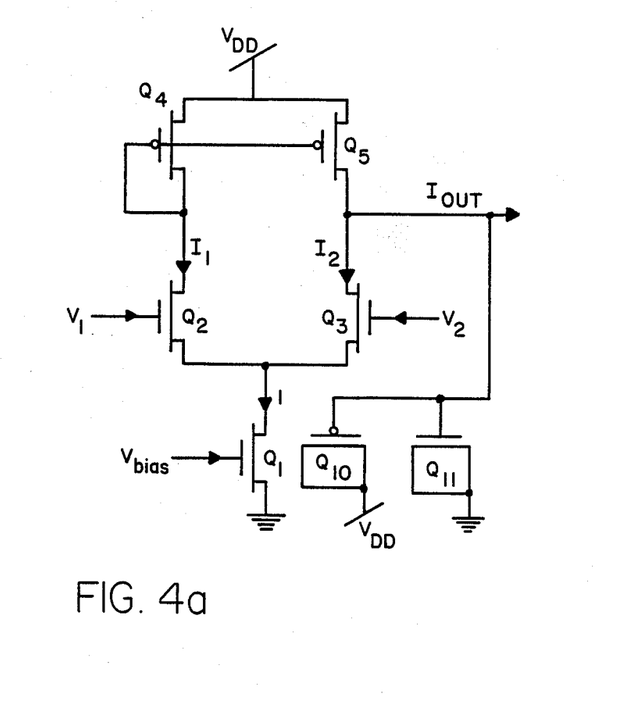
FIG. 4a illustrates a basic CMOS transconductance amplifier and integrating capacitor for the triad synapse shown in FIG. 3.

A circuit diagram of a CMOS implemented integrating amplifier for the triad synapse is shown in FIG. 4a with large storage capacitance at the output. It is a well-known form of differential transconductance amplifier used in a somewhat unusual way. The transconductance, G, of the amplifier is set by a bias voltage, $V_{bias}$, applied to a transistor $Q_1$. In practice the bias voltage is derived from a current mirror used to set the current level for the entire VLSI system in order that the bias current be constant.

Figure 4B:
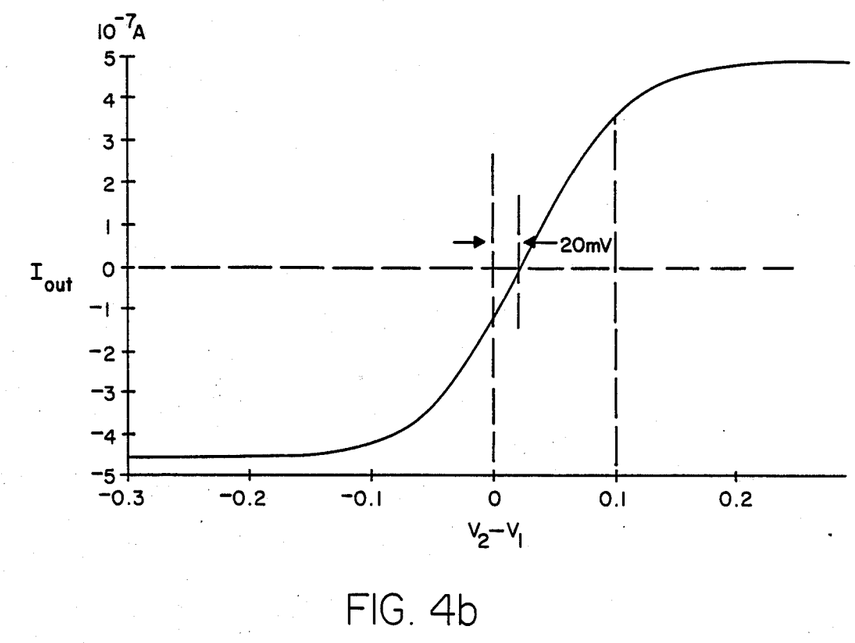
FIG. 4b illustrates in a graph the tanh transfer characteristic of the transconductance amplifier of FIG. 4a, and illustrates an offset of the characteristic curve due to usual mismatch of transistors in an integrated circuit implementation of the amplifier.

The differential transfer function is ideally in the form of a tanh differential transfer function. As shown in FIG. 4b, this function passes through the origin with a slope set by the bias current and becomes saturated with an input voltage differential of about ±0.1 volts. If there is a mismatch between transistor characteristics, the tanh differential transfer function will have the same shape but at $V_2-V_1=0$ the output current $I_{OUT}$ will not be zero, and will instead be slightly positive, or negative as in the example illustrated in FIG. 4b. The input offset is typically about 20mV. However, VLSI circuits can be designed to tolerate such variations.

The tanh transfer characteristic of the transconductance amplifier limits its dynamic range of differential input signals for which linear behavior can be obtained to a range of approximately ±100 mV, as shown in FIG. 4b. For certain applications, it is possible to limit the input voltage difference to any one amplifier, and still process signals of much larger amplitude. All circuits described hereinafter have the feature that they use the collective property of a collection of many amplifiers to process signals of amplitude limited only by the power supply $V_{DD}$.

Figure 5A:
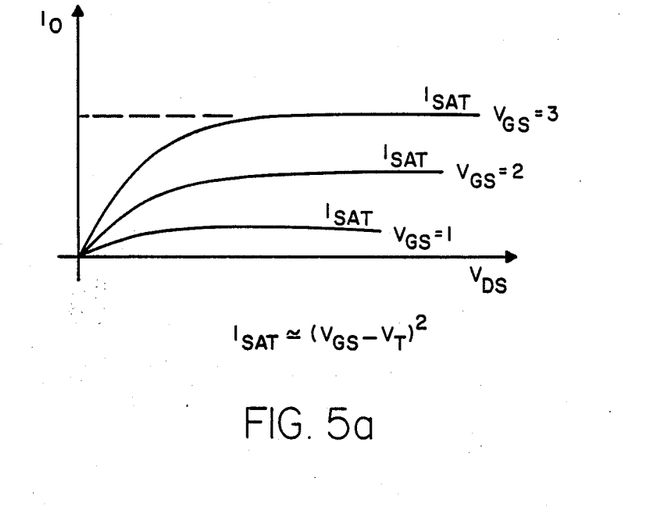
FIG. 5a illustrates a plot of drain current of a CMOS transistor as a function of drain-source voltage $V_{DS}$ for various values of gate-source voltage $V_{GS}$, and FIG. 5b defines "threshold" voltage, $V_T$, for the operation of a CMOS transistor in a plot of the square root of drain current at saturation $\sqrt{I_{SAT}}$, as a function of gate-source voltage $V_{GS}$.
Figure 5B:
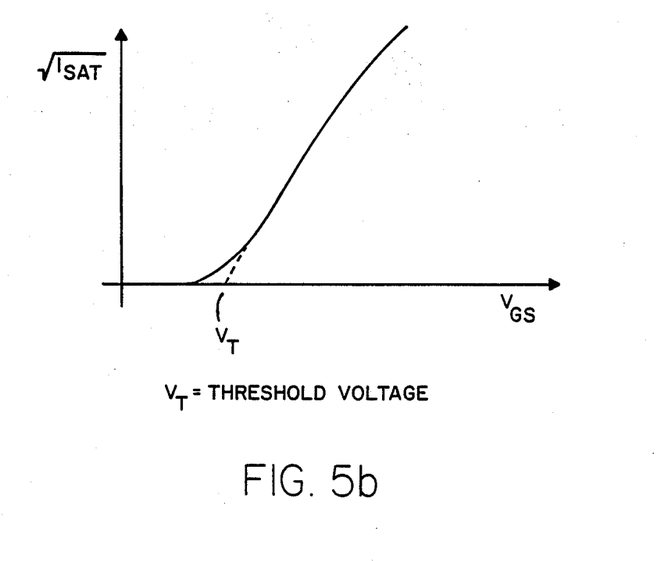

A feature of all circuits to be described is that they are normally biased such that they operate below their threshold voltage, $V_T$. Conventionally, transistors are operated above threshold, such that saturation current is given by:

$$I_{SAT} \sim (V_{GS}-V_T)^2, \quad (1)$$

as shown in FIG. 5a for various values of gate voltage $V_G$. Upon plotting the square root of $I_{SAT}$ as a function of gate-source voltage $V_{GS}$ from Equation (5), and projecting the linear portion of the curve to the axis of $V_{GS}$, a value is determined which corresponds to the amplifier threshold voltage. For the micropower circuits to be described, the transistors in the amplifiers are operated below threshold voltage $V_T$ shown in FIG. 5b. In this range of operation the drain current saturates after the drain-source voltage exceeds a few tenths of a volt, and is exponential in the gate-source voltage. By operating the transistors in this subthreshold range, all analog circuits can be operated on the conventional 5 volt power supply used for digital circuits.

Figure 4C:
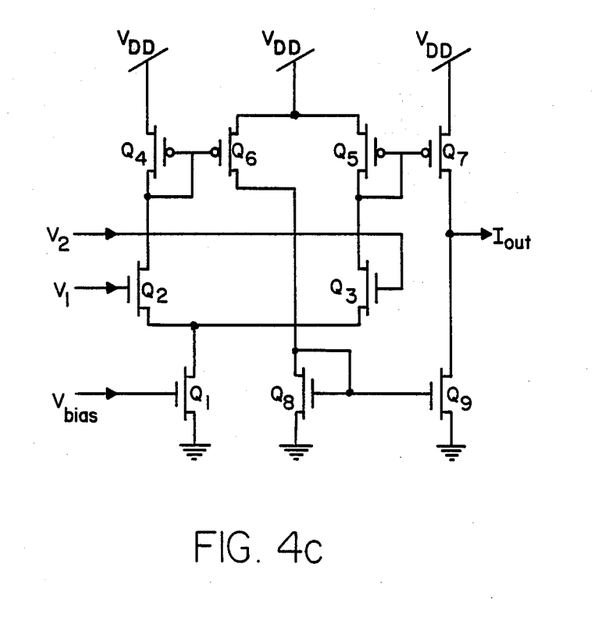
FIG. 4c is a circuit diagram of a transconductance amplifier that is preferred for implementation of the present invention in order to expand the range of minimum input signals values that may be amplified.

The simple differential transconductance amplifier of FIG. 4a will not operate with its output voltage below some minimum value. To remove this restriction on range, we use the circuit shown in FIG. 4c, which includes transistors $Q_6$-$Q_9$. The output voltage of the transconductance amplifier of FIG. 4c can be anywhere in the range from almost 0V to almost $V_{DD}$, which is a wide range for the amplifier.

Referring once again to FIG. 4a, it should be noted that the transconductance amplifier functions with its associated output capacitor C as a follower-integrator circuit. The current into the capacitor is proportional to the difference between its input signal $V_{IN}$ at its positive input terminal, and its output signal $V_{OUT}$ at its negative input terminal. The rate at which $V_{OUT}$ is able to respond to changes in $V_{IN}$ is set by the transconductance G of the amplifier in accordance with the following equation:

$$C\frac{dV_{OUT}}{dt} = G \tanh \frac{(V_{IN} - V_{OUT})}{V_0} \quad (2)$$

where $V_0=80$ mV at room temperature. For small signals, tanh can be approximated by its argument, and Equation (6) becomes $$C\frac{dV_{OUT}}{dt} = G(V_{IN} - V_{OUT}) \quad (3)$$

which can be written in s-notation $$\frac{V_{OUT}}{V_{IN}} = \frac{1}{\tau s + 1} \quad (4)$$

where $\tau = C/G$. The response of the integrator-follower to a step input is very nearly the same as an RC integrator; the two responses are not distinguishably different for a small signal (~40 mV). The temporal-smoothing properties of a single time-constant, such as Equation (3), can be defined as $$V_{OUT}(t) = \int_0^\infty V_{IN}(t - \delta t)e^{-(\delta t/\tau)}d(\delta t) \quad (5)$$

which states that the output at any time it is made up of the input for all previous times, but the contribution of the input of any given time decreases exponentially with time into the past.

The storage capacitance is often implemented by the stray capacitance of the wiring and the circuit elements. If a larger capacitance is required, it can be implemented by the gate-source capacitance of two large-area transistors $Q_{10}$ and $Q_{11}$. This arrangement insures that the capacitance will not vary by more than a factor of two as the voltage $V_H$ from the horizontal resistor network varies between $V_{DD}$ and ground. The lower current-mirror input $V_b$ controls the maximum current that may flow into or out of the storage capacitor, and thus the integrating time constant of the synapse.

It should be noted that the saturating characteristic of all of these circuits is desirable, since it prevents one extreme input from paralyzing an entire area of the network. Thus, even at low input voltage levels, many of the properties of collective circuits can be preserved.

To construct a reasonable space-time derivative system in the horizontal network, time constants of the same order as the time scale of motion events are required and must be provided without using enormous area for capacitance. The horizontal network operates by spreading a potential at one point outward through a resistive network. To keep the time constant of the spreading on the same scale as others in the system, enormous resistor values are required ($10^{11}\Omega$ to $10^{13}\Omega$).

The horizontal resistive network can be implemented by a resistive layer, such as polysilicon, everywhere. There are standard CMOS circuits that include a layer of undoped polysilicon which has a very high resistance. This material is used for pullup resistors in static random-access memories. Such a layer is not available, however, on many commercial processes. The preferred embodiment of this invention uses a transistor circuit to implement a resistor with a control input that allows the resistance to be adjusted electronically. An additional advantage of this circuit is that the current through a given resistive connection is limited to a saturation value, adding greatly to the robustness of the network.

Figure 6A:
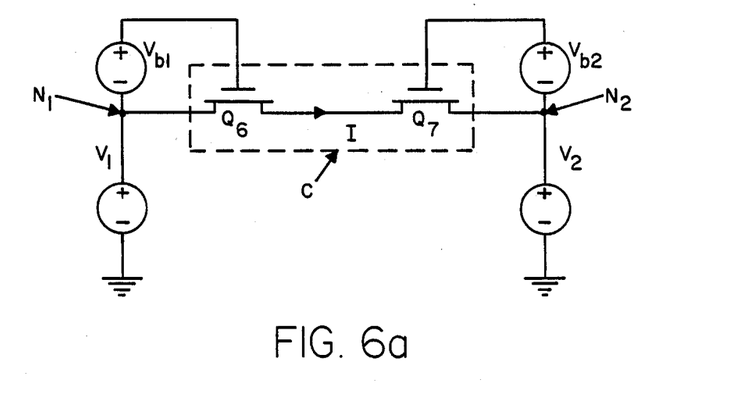
FIGS. 6a illustrates a CMOS circuit implementation of a horizontal resistor shown in FIG. 3.

The most elementary resistive connection is implemented by two pass transistors $Q_6$ and $Q_7$ in series as shown in block C in FIG. 6a. The gate voltage of each transistor $Q_6$ or $Q_7$ is set at a bias voltage $V_b1$ or $V_b2$ above the input voltage $V_1$ or $V_2$. This bias voltage controls the saturation current $I_O$ of the pass transistors $Q_6$ and $Q_7$, and therefore sets the effective resistance of the connection. With $V_1$ equal to $V_2$, the net current flowing between the two nodes $N_1$ and $N_2$ is zero, and the current flowing into or out of either node $N_1$ or $N_2$ is no larger than the leakage currents of the pass transistors to their bulk.

The current through the resistive connection shown in FIG. 6a is given by the expression:

$$I = I_{sat}\tanh\left(\frac{V_1 - V_2}{V_0}\right) \quad (6)$$

Where $V_O$ is about 80 mV for a typical CMOS process at room temperature, and $$I_{sat} \alpha e^{V_b/V_O}.$$

The slope to the tanh function at the origin is unity; therefore the effective resistance R of this kind of resistive connection is $$R = \frac{V_0}{I_{sat}} \quad (7)$$

Several methods can be used to implement the source of the bias $V_{b1}$ or $V_{b2}$ for the pass-transistor resistive connection shown schematically in FIG. 6a. Because of the bulk effect, the value of $I_{sat}$ changes exponentially with transistor source to bulk voltage if the bias is fixed. The bias voltage generator should therefore adjust the value of bias in such a way that the saturation current of the resistive connection can be set by an external control, but not vary as the voltage level in the network changes.

Figure 6B:
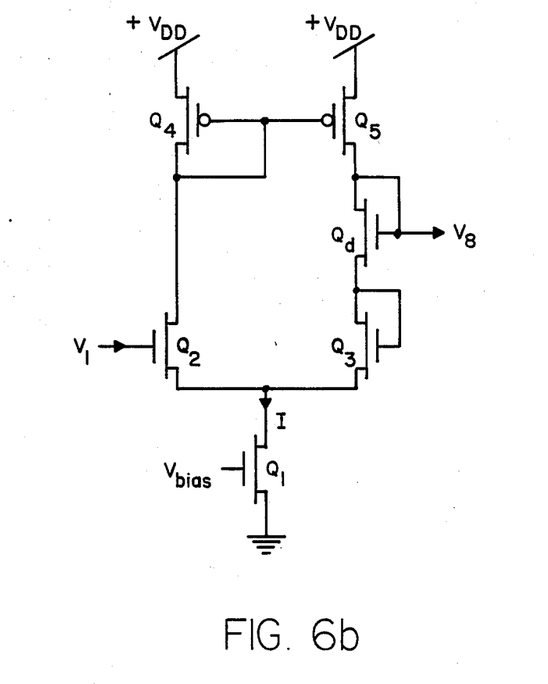
FIG. 6b illustrates a biasing circuit for the circuit of FIG. 6a, FIG. 6c illustrates one follower circuit at one end of a resistance connection having six separate connections to a node $N_1$ from six other follower circuits.

The preferred embodiment of a biasing circuit that achieves these properties with a minimum of components is shown in FIG. 6b. The input signal senses the network voltage at a network tap, for example a voltage $V_1$ applied to the note $N_1$ in FIG. 6a, and the circuit of FIG. 6b generates an output voltage $V_g$ to bias the gates of all pass transistors connected to that node $N_1$. We recognize the circuit as an ordinary transconductance amplifier connected as a follower, with the addition of the diode-connected transistor $Q_d$. Because of the follower action of the transconductance amplifier, the voltage at the gate of transistor Q3, which is connected to the source of transistor $Q_d$, follows the tap voltage $V_1$. The output voltage $V_g$ follows the tap voltage with a positive offset equal to the voltage across $Q_d$. The diode-connected transistor $Q_d$ has both its source and gate voltages equal to those of the pass transistor. Whatever current is flowing in transistor $Q_d$ will be the saturation current of the resistive connection, independent of the tap voltage. This remarkable invariance is accomplished without drawing any current out of the network. The bias current $I_b$ serves two purposes in this circuit: it enables the follower to operate, and it biases the diode-connected transistor $Q_d$. The voltage across $Q_d$, and hence the gate-source voltage of the pass transistor $Q_6$, is set by the bias current. We can therefore use the bias current $I_b$ to control the strength of the resistive connection.

Figure 6C:
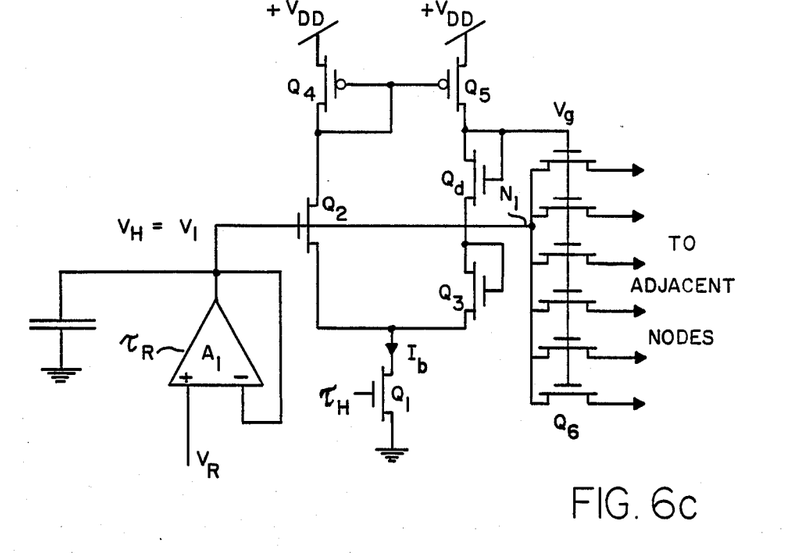
Figure 6D:
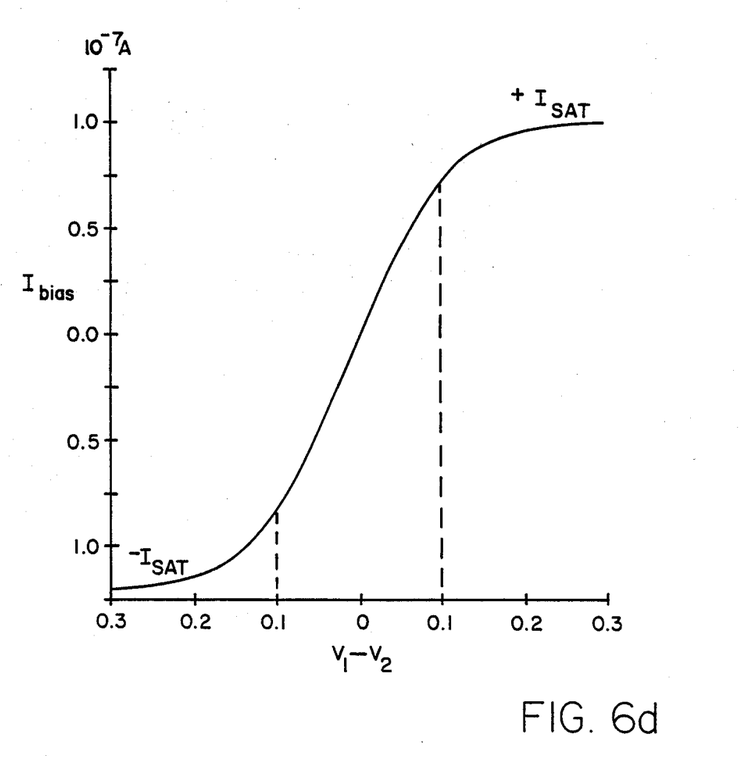

The measured current-voltage curve for the circuit of FIG. 6a with a bias line that is shown in FIG. 6b, is shown in FIG. 6d. The current is linear with voltage across the resistor for differential voltages between $\pm \approx 100$ mV, and saturates at $I_{sat}$ for larger voltages. The negative saturation current is not equal to the positive saturation current, due to the mismatch between transistors in the bias circuit on the left and those in the bias circuit on the right. In spite of this mismatch, the current flowing from one circuit to the other is guaranteed to pass through zero at zero voltage, except for leakage current of the source and drain regions to substrate. The leakage currents are usually negligible compared with $I_{sat}$.

Figure 11:
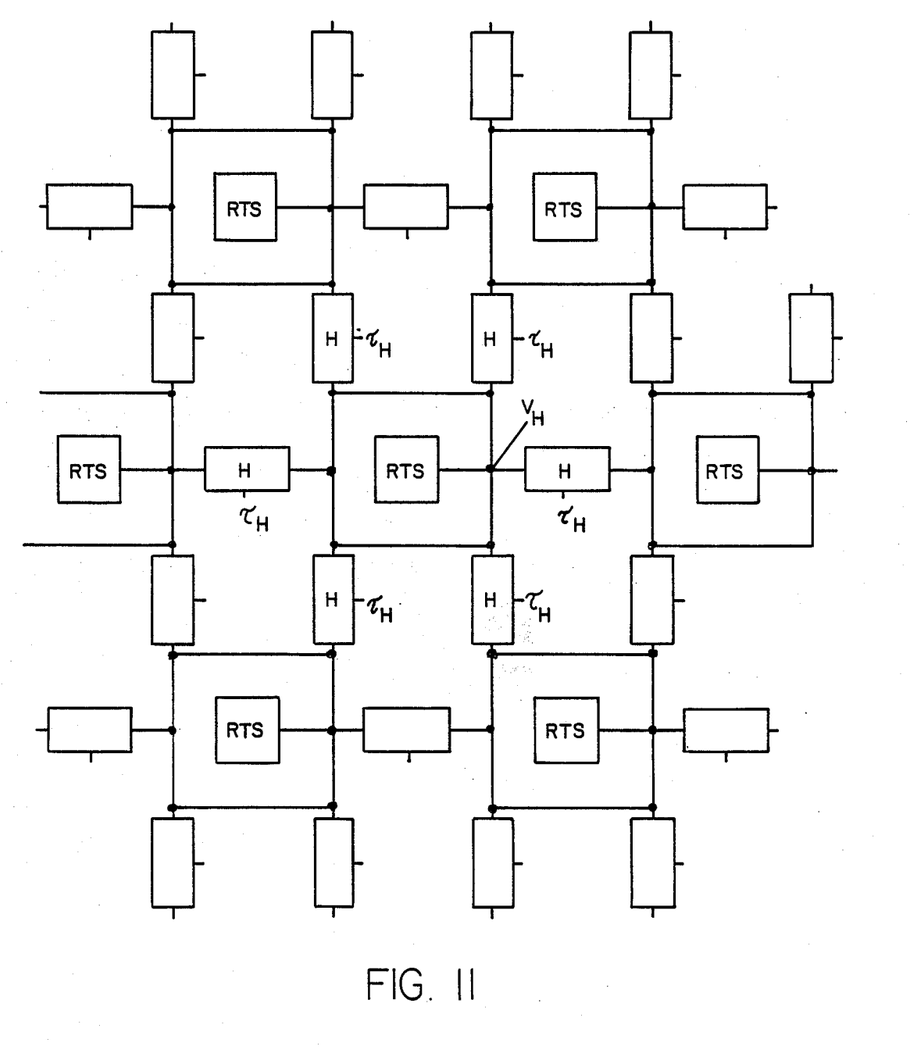
FIG. 11 is a block diagram of a hexagonal array of photoreceptors and horizontal resistor networks for extension of the linear array of photoreceptors in the Y-axis to a two-dimensional planar array.

In a network as shown in FIG. 2, the circuit block C in FIG. 6a is represented by a block labeled H to represent a horizontal resistor H. The bias circuits at each end of a resistive connection are not represented in FIG. 2, but may be regarded as being at the junction between the triad synapse TS and bipolar cell B shown in FIG. 3. In that case there is only an input $V_1$ from one triad synapse, and an input $V_2$ from the triad synapse on the other side of the horizontal resistor. For vision applications like the retina, however, a two-dimensional network of high connectivity and symmetry is required. The topology shown in FIG. 11 is the preferred embodiment of such a two-dimensional network. Only six horizontal resistors are labeled H around one photoreceptor and triad synapse combination, RTS, implemented as shown in FIG. 3. It is evident that each block labeled RTS also has six horizontal resistors (not labeled) and that the output of each block RTS is connected to a node represented by a conductive square around the block RTS. It is thus clear that each horizontal resistor is connected at each end to a separate node. The array may be readily expanded in all directions without limit.

Figure 12:
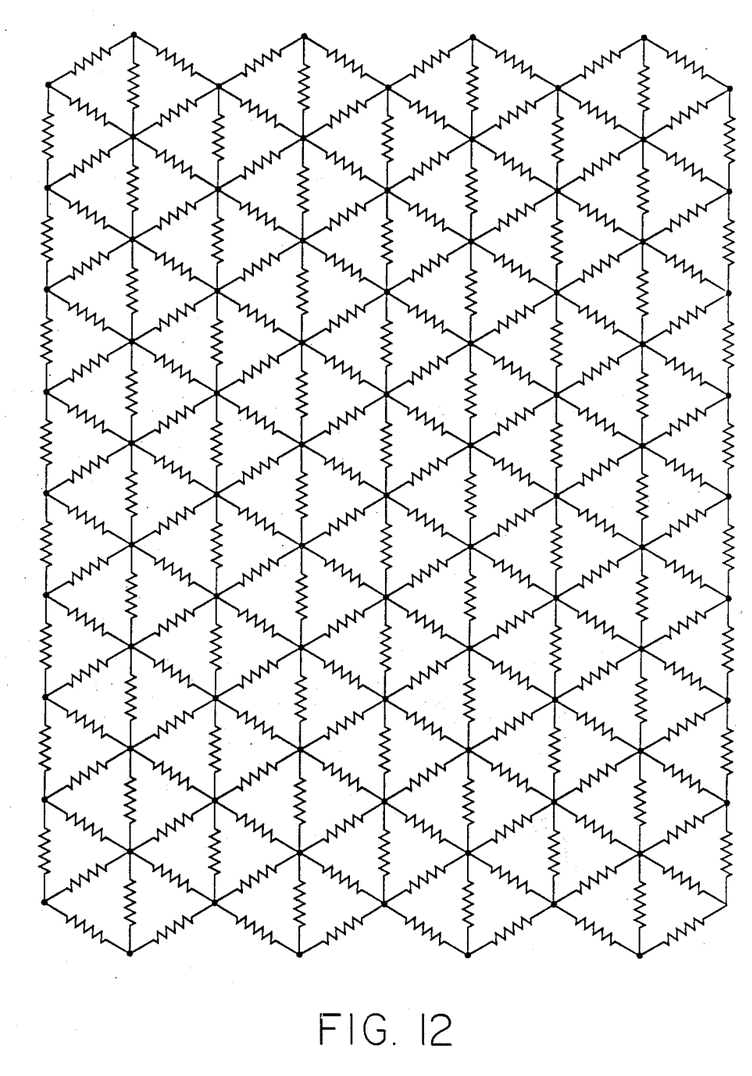
FIG. 12 illustrates schematically how the array of FIG. 11 may be envisioned by a network of resistors and a photoreceptor at each junction of six resistors.

In FIG. 11, the hexagonal network shown is comprised of six horizontal resistors H connected to a single network node, and sharing a single bias circuit comprised of transistors $Q_1$ through $Q_5$ and $Q_d$ as shown in FIG. 6c. The hexagonal network of FIG. 11 may be represented by a network of resistors as shown in FIG. 12, where each resistor is a resistive connection C having bias circuits $V_b1$ and $V_b2$ at the ends as shown in FIG. 6a. The voltage sources $V_1$ and $V_2$ shown in FIG. 6a at each end of a resistive connection C represent the nodes where six resistive connections share one follower circuit and one bias circuit. At each node, such as node $N_1$ in FIG. 6a, there are thus six resistive connections with six transistors, $Q_6$ or $Q_7$, sharing a single input terminal at a single follower circuit, such as $A_1$, and a single bias circuit as shown in FIG. 6c.

Figure 7:
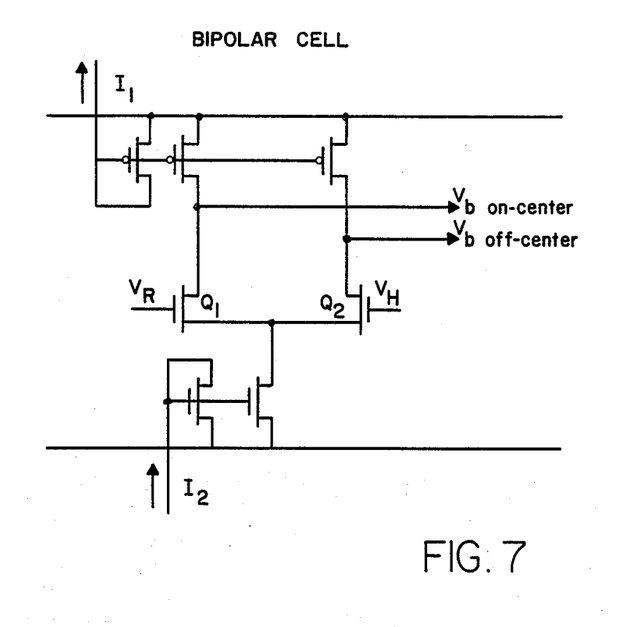
FIG. 7 illustrates a CMOS circuit for the bipolar cell of FIG. 6.
Figure 8:
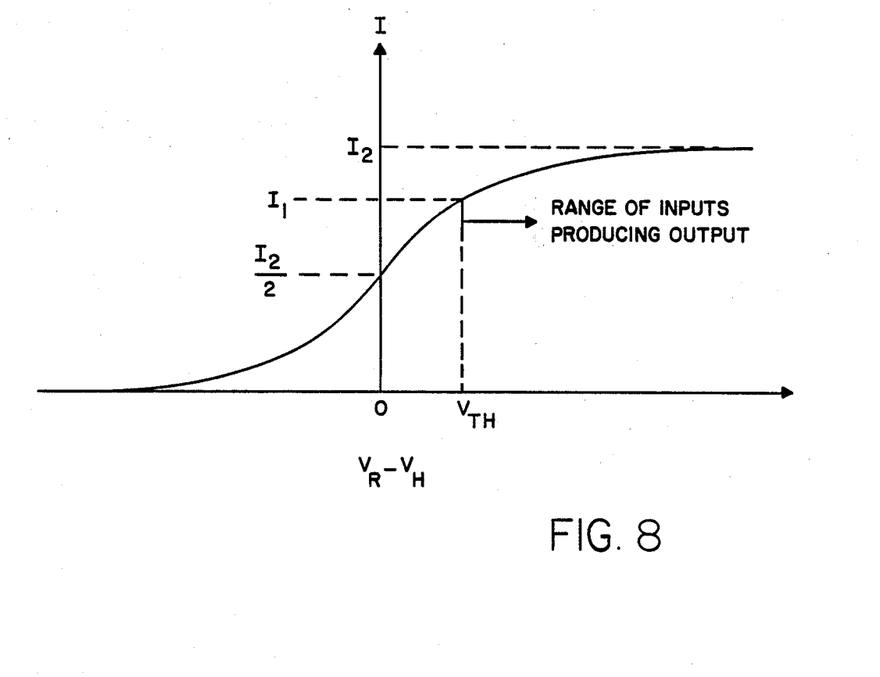
FIG. 8 illustrates the I-V characteristic of a bipolar cell with a limiting function imposed.

The bipolar cell B shown in FIG. 2 can be implemented by either two differential amplifiers as indicated in FIG. 3, or it can be implemented by a single differential complementary output CMOS amplifier as shown in FIG. 7. It thresholds the output of the triad synapses TS and carry the signal forward with a limiting function shown in FIG. 8. The difference between the receptor output $V_R$ and the horizontal voltage $V_H$ from a horizontal resistor network H is computed by the CMOS bipolar circuit of FIG. 7 in one differential amplifier that has two outputs, one for OFF-CENTER events, and one for ON-CENTER events. The current in the drain of one member of the differential pair of right and left transistors $Q_1$ and $Q_2$ is shown as a function $V_R-V_H$ in FIG. 8. The current in the other drain is identical, with polarities reversed, since their sum must be $I_2$. The threshold current $I_1$, is set to be less than $I_2$. The greater than $I_2/2$. An output is generated when either the right or left transistor differential current is greater than $I_1$. The size of a bipolar input event that is allowed to produce an output can thus be controlled over a considerable range by changing $I_2$.

Figure 9:
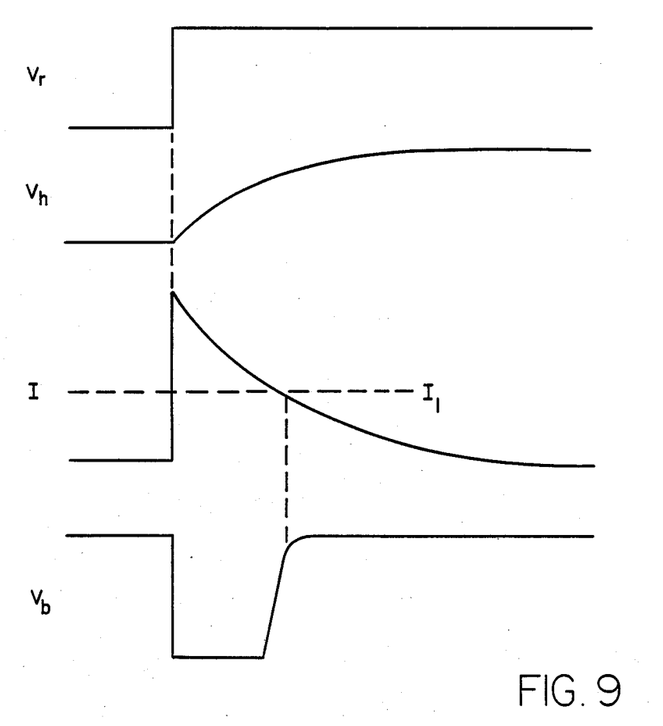
FIG. 9 show waveforms that illustrate the output response $V_b$ of a bipolar circuit to a stepwave input signal $V_R$ from a photoreceptor through a triad synapse as shown in FIG. 3.

The way in which space-time differentiation occurs can be reasoned as follows: Assume a step in the receptor signal $V_R$, as shown in FIG. 9. $V_H$ will follow with a single time-constant response as shown. The difference $V_R-V_H$ is converted into a current by the transistor differential arrangement of FIG. 7. However, the current source "pull-up" transistors $Q_3$ and $Q_4$ are fixed by the $I_1$ input. When the difference current exceeds $I_1$, the corresponding $V_b$ output will go low.

It should be clear from the foregoing that the bipolar circuit of FIG. 7 takes a space-time derivative $V_R-V_H$ by computing the difference between a photoreceptor signal $V_R$ and its space-time-integrated form $V_H$. This method assures that the noise in the output is never more than that in the input signal itself, and is thus exceedingly effective at providing reliable motion information.

In the configuration shown, maximum outputs will occur when high contrast features move over the retina. Strictly for time derivative purposes, the horizontal network shown in FIG. 6a is not needed at all. To disable the horizontal resistors, the $V_{bias}$ (or $\tau_H$) input current is set to zero. However, when the horizontal network is enabled, it computes a space differential, i.e., a signal which represents the extent to which an individual receptor receives substantially more light than the average of its neighbors. It is thus most sensitive to a point, less to a corner, less to an edge, and not at all to a uniform gradient. The system can be made to show sustained response to one of its favorite stimuli even if that stimulus is not moving.

The setting of $I_1$ into the bipolar cell shown in FIG. 7 is critical, since it determines the threshold of activity at which output will be generated. The optimum threshold is likely to be different at different points in the image. It therefore seems desirable to derive a separate value of $I_1$ for each bipolar cell. These values are generated dynamically from local properties of the image. A circuit implementing this "automatic gain control" function in the bipolar cells is shown in FIG. 10.

Figure 10:
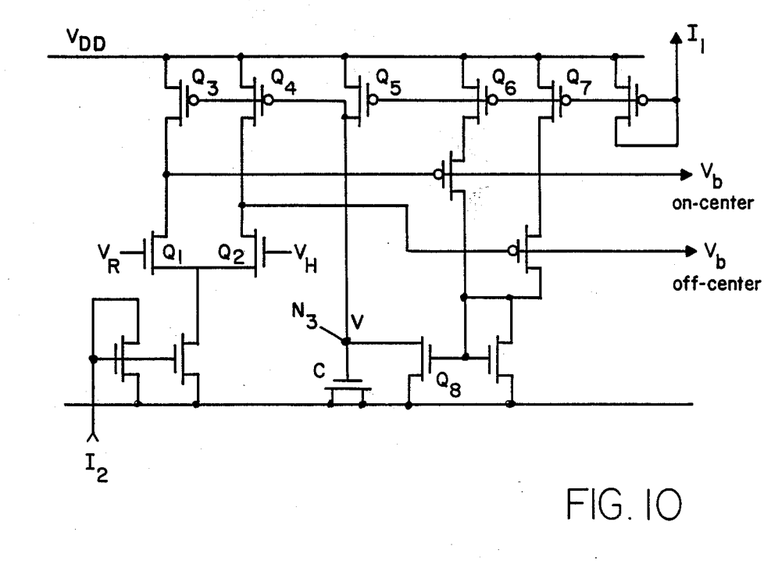
FIG. 10 illustrates a CMOS circuit for a bipolar circuit with automatic gain control.

Referring to FIG. 10, a control voltage V is stored on a capacitor C. A fixed, small leakage current into a node $N_3$ is provided by transistor $Q_5$. If either the $V_b$ ON-CENTER or the $V_b$ OFF-CENTER output goes low, a current limited by transistor $Q_6$ or $Q_7$ flows out of the node $N_3$ by the action of the transistor $Q_8$ current mirror. The $Q_6-Q_7$ limiting current must, of course, be larger than the $I_{leak}$ current set by transistor $Q_5$. In the present implementation, transistor $Q_5$ has a length/width ratio about 6 times that of $Q_6$ and $Q_7$. The net effect is that the output terminals will normally sit just at the point where they begin to cause current in transistor $Q_3$ and $Q_4$ at the point where $I_2/2$ flows in each.

When an event occurs in an image, one of the output terminals will go low. The voltage V at the node $N_3$ will increase at a rate set by the current of transistors $Q_6$ or $Q_7$. As soon as the voltage V reaches a value where the average activity is causing the time-average of the currents of transistors $Q_6$ and $Q_7$ to be equal to the steady current of transistor $Q_5$, V will stabilize. If activity decreases, V will increase in such a way that the time-averaged output tends to stay constant. Such a circuit will have the effect that larger changes in the image are needed in regions experiencing a constant high level of activity, while regions of low activity will be perched on the peaks of the noise. It would seem that this kind of mechanism would be desirable throughout the system, not only to enhance the sensitivity of the retina, but to remove any need for global adjustments.

Referring now to FIG. 11, a hexagonal array of photoreceptors R, each with its triad synapse TS, represented by a block RTS, is shown, arranged with a cluster of horizontal resistors around each node in a network modeling the mammalian retina. FIG. 12 illustrates the horizontal resistors with the RTS blocks at each connection of six "horizontal resistors." The "horizontal resistors" provide lateral conduction in every direction; horizontal, vertical, and diagonal (upper left to lower right and upper right to lower left). It is also evident that the hexagonal array may be expanded to virtually any size required, such as 500 photoreceptors in the X-axis, and 500 photoreceptors in the Y-axis, for a hexagonal field of vision with pixel resolution comparable to that of a high-quality television image. However, for many applications of the invention, such resolution is not necessary. An experimental implementation has been carried out in a single 8.6 mm × 7.6 mm VLSI chip with a 48 × 48 hexagonal array of receptors, and nearly 100,000 analog transistors. Such an implementation would likely provide adequate vision for robotic equipment designed to carry out repetitive motions in respect to "familiar" parts, or for the recognition of characters in printed text.

Each cluster of six horizontal resistors connected to a photoreceptor and triad synapse circuit RTS provides an output voltage $V_H$. The capacitor to ground of the triad synapse (the integrating capacitor) accomplishes temporal smoothing of the output voltage $V_H$. The photorector itself provides an output voltage that is logarithmic in the light intensity over 4 to 5 orders of magnitude. That intensity range is comparable to that covered by the "cone" photoreceptor cells in a living system. The logarithmic characteristic provides an output voltage difference proportional to the contrast ratio, independent of the absolute illumination of the scene. The horizontal resistors may then be though of as providing an average of the signal values in the neighborhood of other photoreceptors each with a triad synapse.

Each local triad synapse circuit takes the difference between the potential $V_H$ of the horizontal network and the photoreceptor output, and drives the local potential of the horizontal network toward the local photoreceptor output potential $V_R$ as described with reference to FIGS. 3. The bipolar cell which follows computes the difference between a photoresistor output $V_R$ and its time and space integrated form $V_H$. The "derivative" so computed is the difference between the local input signal $V_R$ and a spatially and temporally smoothed version of the signal. The spatial part of the differential processing emphasizes areas in the image containing the most information. The emphasis corresponds to a discrete approximation to the Laplacian derivative operator. The temporal part of the processing is a finite-gain, single-time constant differentiation.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. An analog circuit for simultaneously computing the space-time average of a plurality of signals at inputs to an array comprising
    a plurality of nodes, each having capacitance connected to a source of fixed potential,
    a network of resistive connections between said plurality of nodes in said array,
    a separate integrator associated with each of said signal inputs, and
    means for injecting a current into each node of said array through said separate integrator associated therewith such that the magnitude of said current is an odd, monotonically increasing function of the potential difference between one of said signal inputs and said node.

2. Apparatus as defined in claim 1 wherein said resistive connection between any first node and any second node of said network comprises a transistor circuit means, the current flowing through said circuit means when the potential difference is zero between said first node and said second node being no larger than the leakage currents of the transistors in said circuit, and said current being a monotonically increasing function of the potential difference between said first node and said second node.

3. Apparatus as defined in claim 1 wherein each of said means for injecting current into each node of said array comprises a differential transconductance amplifier having positive and negative input terminals, an output terminal, and transconductance control terminal, said positive input terminal being connected to one of said signal inputs, said negative input terminal being connected to said output terminal, said output terminal being connected to one node of said array, and said transconductance control terminal being connected to a source of bias voltage for control of the weight with which said input signal drives the node associated therewith.

4. Apparatus as defined in claim 1 wherein said means for injecting a current into each node of said array comprises a plurality of differential amplifying means, each said differential amplifying means having a positive and a negative input terminal and an output terminal, one of said input terminals being connected to one of said signal inputs, the other of said input terminals being connected to a junction between said capacitance connected to a source of fixed potential and one of said nodes, whereby said differential amplifying means produces an output signal which is a monotonic function of the potential difference between said signal input and said one node, whereby each output is an approximation to a first temporal derivative and a second derivative of said plurality of signal inputs, and said signals are processed simultaneously without being subjected to aliasing due to time sampling.

5. A CMOS analog integrated circuit for simultaneously computing the space-time average of a plurality of signal inputs comprising
    a plurality of nodes in an array,
    a network of resistive connections, one resistive connection between each pair of adjacent nodes in said array, each node having a capacitance to a source of fixed potential,
    each resistive connection between a pair of nodes of said network comprising an MOS transistor circuit, the current flowing through said circuit when the potential difference is zero between said nodes being no larger than the leakage current of the MOS transistors in said circuit, and said current being a monotonically increasing function of the potential difference between said nodes, and
    means for injecting current into each node of said array such that the magnitude of said current is a monotonically increasing function of the potential difference between a separate one of said signal inputs and said node.

6. Apparatus as defined in claim 5 wherein said input signals comprise the outputs of photoreceptors integrated on the same silicon surface as the computation circuitry, each photoreceptor comprising
    a bipolar transistor formed as a natural byproduct of the CMOS process, the collector of said bipolar transistor being formed by the substrate, said substrate being connected to a first power supply terminal, the base of said bipolar transistor being formed by a well diffusion, the emitter of said bipolar transistor being formed by diffused area within the base well region and of opposite type from the type of said well region,
    first and second diode-connected MOS transistors, each having source, gate, and drain terminals, and each having its gate connected to its drain,
    said diode-connected transistors having source and drain diffusions of the type opposite to the type of the well, and being fabricated within a well region isolated from the well region forming the base of said bipolar transistor,
    the source of said first diode-connected transistor being connected to a second power supply terminal, and to said well region containing said two diode-connected transistors, the drain of said first diode-connected transistor being connected to the source of said second diode-connected transistor, the drain of said second diode-connected transistor being connected to the emitter of said bipolar transistor, and forming one of said signal inputs to said circuit, whereby a light image focused upon the surface of said integrated circuit produces signal inputs that are logarithmic in the intensity of said light image.

7. Apparatus as defined in claim 4 wherein said resistive connection between any first node and any adjacent second node of said network comprises a first MOS pass transistor with source, gate, and drain terminals, the source terminal of said first transistor being connected to said first network node, a second MOS pass transistor with source, gate and drain terminals, the source terminal of said second transistor being connected to said second network node, and the drains of said two pass transistors being connected together, a first bias means for setting the potential on the gate terminal of said first pass transistor relative to said first network node in such a manner that the drain saturation current of said first pass transistor is independent of the potential on said first network node, and a second bias means for setting the potential on the gate terminal of said second pass transistor relative to said second network node in such a manner that the drain saturation current of said second pass transistor is independent of the potential on said second network node, whereby the current flowing through said resistive connection from said first network node to said second network node is no larger than the leakage currents of said MOS pass transistors when the potentials of said two network nodes are equal, and the current flowing through said resistive connection in either direction cannot exceed the drain saturation current of said MOS pass transistors when the potentials of said two network nodes are not equal.

8. Apparatus as defined in claim 7 wherein the bias means for setting the potential on the gate terminal of all pass transistors with source terminals connected to a given network node comprises a bias transistor and an input transistor, each having source, gate, and drain terminals, the source of said bias transistor being connected to a first power supply terminal, first and second diode-connected transistors, each having source, gate, and drain terminals, and each having its gate connected to its drain, said bias transistor, input transistor, and said first and second diode-connected transistors being of the same type as said pass transistors, the drain of said bias transistor being connected to the sources of both said first diode-connected transistor and said input transistor, the drain of said first diode-connected transistor being connected to the source of said second diode-connected transistor, the gate of said input transistor being connected to said network node, first and second current-mirror transistors, each having source, gate, and drain terminals, each having its source connected to a second power supply terminal, both gate terminals being connected to the drain of said first current-mirror transistor, and both said current-mirror transistors being of the opposite type as said pass transistors, the drain of said first current-mirror transistor being connected to the drain of said input transistor, and the drain of said second current-mirror transistor being connected to the drain of said second diode-connected transistor, and to the gates of all said pass transistors with sources connected to said network node, whereby the drain saturation current of said pass transistors are independent of the potential on said network node.

9. Apparatus as defined in claim 8 wherein each differential amplifying means comprises: a differential transconductance amplifier having a transconductance control terminal, said transconductance control terminal being used to control the magnitude of the output signals for a given magnitude of input signals.

10. An array of resistive connections in an analog circuit for simultaneously computing the space-time average of a plurality of input signals comprising a plurality of nodes, said adjacent ones of said nodes being connected together by separate ones of said resistive connections, each resistive connection having one end connected to one of said nodes and its other end connected to an adjacent node, each analog circuit having a separate means for producing a signal input, and each node having a capacitance connected to a source of fixed potential, each of said means for producing a signal input serving to inject a current into a separate node of said array such that the magnitude of said current is an odd, monotonically increasing function of the potential difference between one of said signal inputs and said node.

11. Apparatus as defined in claim 10 wherein said resistive connection between any first node and any second node of said network comprises a transistor circuit means, the current flowing through said circuit means when the potential difference is zero between said first node and said second node being no larger than the leakage currents of the transistors in said circuit, and said current being a monotonically increasing function of the potential difference between said first node and said second node.

12. Apparatus as defined in claim 11 wherein each of said means serving to inject current into each node of said array comprises a differential transconductance amplifier having positive and negative input terminals, an output terminal, and transconductance control terminal, said positive input terminal being connected to one of said signal inputs, said negative input terminal being connected to said output terminal, said output terminal being connected to one node of said array, and said transconductance control terminal being connected to a source of bias voltage for control of the weight with which said input signal drives the node associated therewith.

13. Apparatus as defined in claim 12 wherein said means serving to inject a current into each node of said array and comprising a plurality of differential amplifying means each has a positive and a negative input terminal and an output terminal, one of said input terminals being connected to one of said signal inputs, the other of said input terminals being connected to a junction between said capacitance connected to a source of fixed potential and one of said nodes, whereby said differential amplifying means produces an output signal which is a monotonic function of the potential difference between said signal input and said one node, whereby each output is an approximation to a first temporal derivative and a second spatial derivative of said plurality of signal inputs, and said signals are processed simultaneously without being subjected to aliasing due to time sampling.

* * * * *